Aug. 9, 1966       S. T. ATTERBURY       3,265,405
BICYCLE STORAGE
Original Filed April 21, 1964
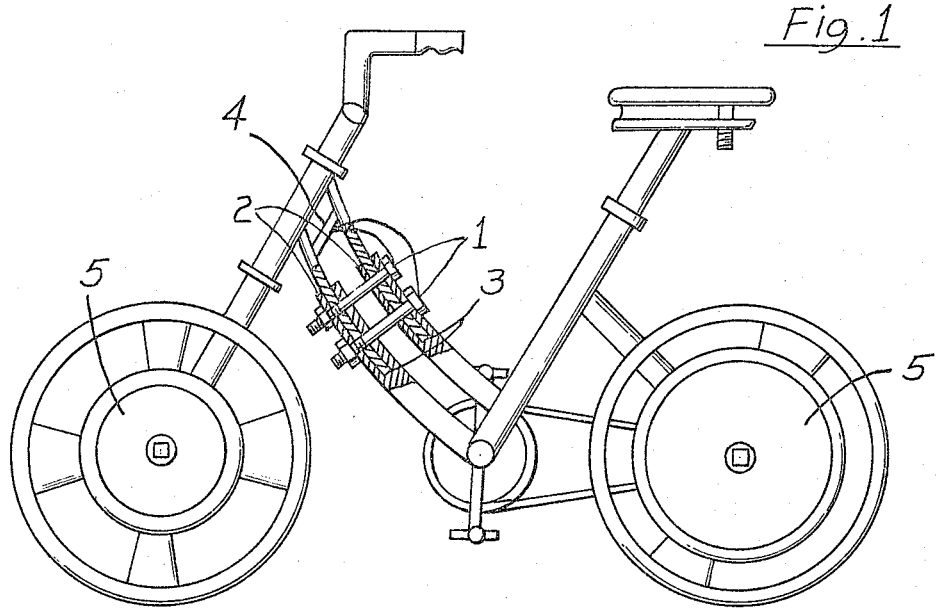
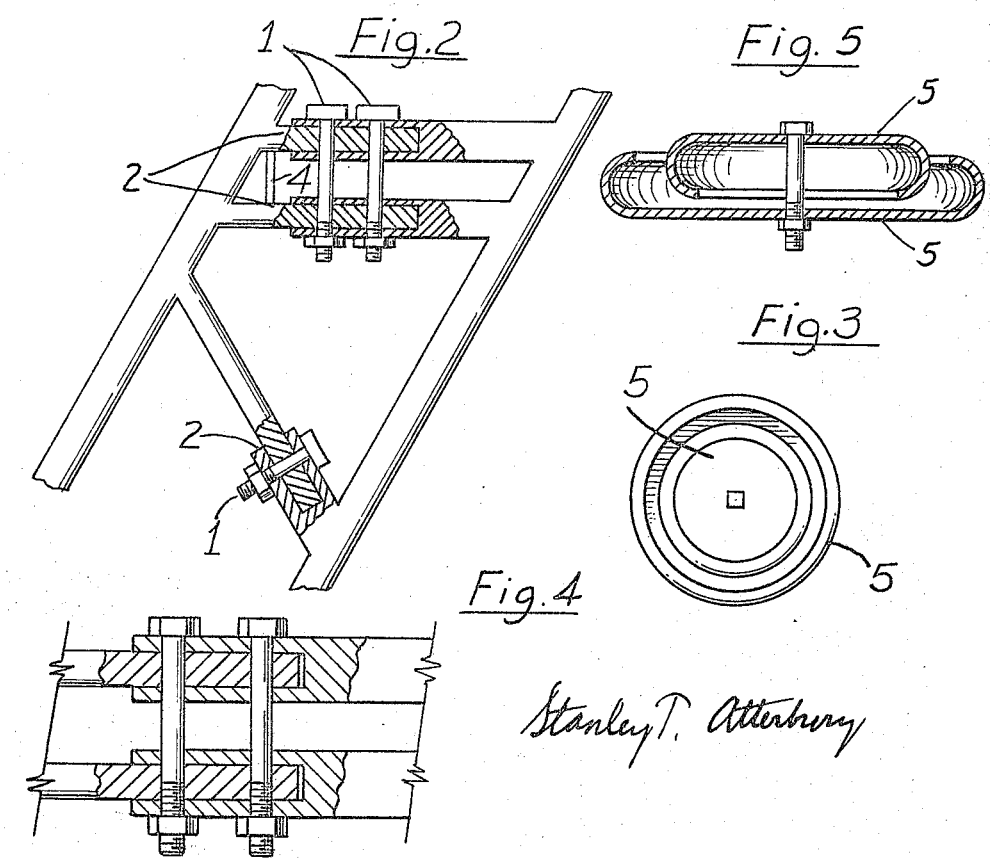
Stanley T. Atterbury

United States Patent Office 3,265,405
Patented August 9, 1966

1

3,265,405
BICYCLE STORAGE
Stanley T. Atterbury, 9745 S. Ingleside Ave.,
Chicago, Ill. 60628
Continuation of application Ser. No. 361,504, Apr. 21,
1964. This application June 24, 1964, Ser. No. 377,560
1 Claim. (Cl. 280—287)

This invention relates to bicycle storage, and is a continuation of my copending application Serial Number 361,504 filed April 21, 1964, now abandoned.

This invention relates to a method, where a bicycle can be knocked down into two separate parts front and rear, in a few minutes. The trunk of your car opened, and the front part of a bicycle with a small curled disk, is laid on top of a rear part of a bicycle with a larger disk, for storage in the trunk of your car. The trunk is shut tight.

Further object of this invention is to save time, you park your car away from a congested area, take the two parts of the bicycle out of the trunk of your car, assemble it in a few minutes, go to your destination, park it, then pedal back to your car, knock it down into two separate parts, and store it in the trunk of your car.

Still another object is to transport a bicycle in the trunk of your car on a vacation, where children have a use for it. Other objects will appear as the specification proceeds.

This invention is shown, as an illustrative embodiment, by the accompanying drawing, in which—

FIGURE 1 is a transverse view of my invention showing two disks, front and rear, on wheels, and apparatus for assembling and separating bicycle in two parts, front and rear.

FIGURE 2 is a transverse sectional view of bars, with bolts and nuts, for assembling and separating a boy's bicycle.

FIGURE 3 is a front elevation view showing one small disk, on top of a larger disk with an axle and nut in the center.

FIGURE 4 is an enlarged view showing how the bars and bolts for the bicycle are fitted.

FIGURE 5 is a transverse sectional view of two disks with curled edges, one fitted into another.

Referring to FIGURE 1, this view shows two bolts 1 with screws that go through four holes of round bars, which hold the bicycle together. Two bars are cut at 2, to form the rear part of the bicycle, and 3 is the front part of two bars which are smaller and fit like a sleeve into larger rear two bars. They are held together by two bolts and screws 1. The bar 4 holds two chains (not shown) that are attached to the bolts so they will not be misplaced. Disks 5 are secured to the front and rear wheels.

2

The front disk is smaller than the rear disk, and when the bicycle is knocked down, the front disk is laid on top of the rear disk for storage in the trunk of a car. The curled edges of the disks prevent the bicycle from moving around in the trunk and damaging the bicycle.

FIGURE 2 is the arrangement used in a boy's bicycle with the three bolts and nuts.

The two metal disks with curled edges are illustrated in FIGURE 3 as they are laid one on top of the other, with the center axle and nut securing them.

FIGURE 4 is another sectional view of two metal disks, showing curled edges fitted into each other, as they would appear, one on another.

While in the foregoing specification I have set forth a specific structure in detail, it will be understood that such detail may be varied widely by those skilled in the art without departing from the spirit of my invention.

What I claim is:

In a knock-down bicycle, a first metal disk that is disk-shaped and has a curled edge, said first disk being secured to center bolt of the front wheel with said center bolt extending axially of said first disk and said curled edge extending outwardly of said wheel, a second larger metal disk that is disk-shaped and has a curled edge, said second disk secured to the center bolt of the rear wheel with said last-mentioned center bolt extending axially of the second disk and said last-mentioned edge extending outwardly of the rear wheel, said curled edge of the first metal disk being receivable within said curled edge of said second disk when bicycle is stored in the trunk of a car.

References Cited by the Examiner

UNITED STATES PATENTS

| | | | |
|---|---|---|---|
| 756,403 | 4/1904 | Plowman | 24—216 |
| 821,868 | 5/1906 | Grimme | 280—289 |
| 1,665,437 | 4/1928 | Booth | 301—37 |
| 2,031,092 | 2/1936 | Begg | 301—37 |
| 2,372,024 | 3/1945 | Schwinn | 280—287 |
| 2,746,769 | 5/1956 | Hoogendorn | 280—287 |
| 2,993,709 | 7/1961 | Wick | 280—287 |
| 3,045,309 | 7/1962 | Johnson | 24—216 |

FOREIGN PATENTS

| | | |
|---|---|---|
| 178,999 | 5/1922 | Great Britain. |

KENNETH H. BETTS, *Primary Examiner.*